United States Patent [19]
Choi

[11] Patent Number: 5,670,857
[45] Date of Patent: Sep. 23, 1997

[54] METHOD OF RETURNING TO AN ABSOLUTE ZERO POINT FOR USE BY AN INDUSTRIAL CONTROLLER

[75] Inventor: Sang-jin Choi, Seoul, Rep. of Korea

[73] Assignee: Samsung Electronics Co., Ltd., Kyungki-do, Rep. of Korea

[21] Appl. No.: 642,604

[22] Filed: May 3, 1996

[30] Foreign Application Priority Data

May 4, 1995 [KR] Rep. of Korea .............. 95-11015

[51] Int. Cl.⁶ .................. G05B 19/25; G06F 7/64
[52] U.S. Cl. .............. 318/573; 318/568.13; 364/474.31; 364/577; 395/87
[58] Field of Search ............... 318/560, 563, 318/568.22, 568.13, 573, 569, 572; 364/474.28, 474.31, 577, 570; 395/89, 87, 97

[56] References Cited

U.S. PATENT DOCUMENTS

| | | | |
|---|---|---|---|
| 4,477,754 | 10/1984 | Roch et al. | 318/569 |
| 4,484,287 | 11/1984 | Gamo et al. | 318/563 |
| 4,849,678 | 7/1989 | Kamiguichi et al. | 318/572 |
| 4,980,839 | 12/1990 | Souji et al. | 318/568.22 |
| 5,075,870 | 12/1991 | Kojyo et al. | 395/89 |

Primary Examiner—John W. Cabeca
Attorney, Agent, or Firm—Sughrue, Mion, Zinn, Macpeak & Seas, PLLC

[57] ABSTRACT

A method is provided of an industrial controller, such as that used for controlling a robot or a computerized numeric controller, of returning to an absolute zero point. A main controller moves an axis toward a center sensor on the basis of a position signal of the axis received from right and left limit sensors and the center sensor, to determine an approximate position of the absolute zero point. A position controller then controls a motor by a position control command having an interpolated short time period and detects a zero-pulse generated from the motor, thereby determining the absolute zero point. Thus, the absolute zero point is always positioned in a predetermined place, and since the speed of detecting the zero-pulse can be determined by the position controller regardless of the main controller, the time for returning to the absolute zero point is reduced.

3 Claims, 2 Drawing Sheets

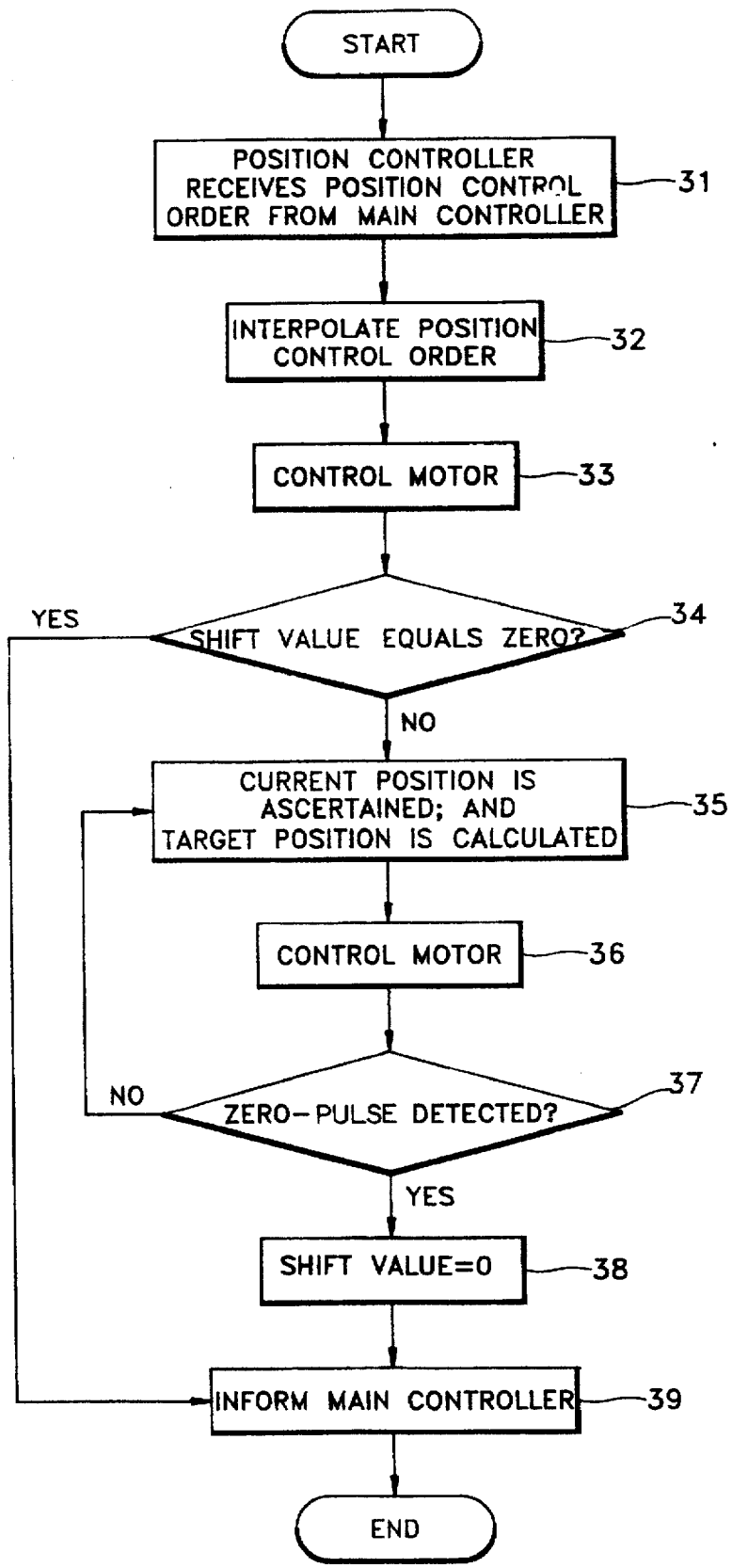

METHOD OF RETURNING TO AN ABSOLUTE ZERO POINT FOR USE BY AN INDUSTRIAL CONTROLLER

BACKGROUND OF THE INVENTION

The present invention relates to an industrial controller used for a robot or a computerized numeric control machine, and more particularly, to a method of an industrial controller for rapidly returning to an absolute zero point using a zero-pulse of a motor.

FIG. 1 is a block diagram of a typical controller of a robot. The controller is provided with a main controller 11, a dual-port RAM 12, a position controller 13, a servo 14 and a motor 15. Here, the main controller 11 exchanges information with the position controller 13 through the dual-port RAM 12. An interrupt function of the dual-port RAM 12 is used for its communication with the main controller 11 and position controller 13.

Referring to FIG. 2, a conventional method of returning the controller to an absolute zero point will be described as follows.

As each axis of the robot moves through a left limit sensor 21, a central sensor 22 and a right limit sensor 23 which are connected to the main controller 11, the place where the axis encounters the central sensor 22 is determined as an absolute zero point.

In detail, when an axis of the robot encounters the left limit sensor 21 or right limit sensor 23, the axis changes direction to move toward the central sensor 22. That is, as shown in a case 1, when the axis moves to the right from a start point 1a, i.e., a point near the left limit sensor 21, the place where the axis meets with the central sensor 22 is determined as the absolute zero point. On the other hand, as shown in a case 2, when the axis first encounters the central sensor 22 during its leftward movement from a start point 2a, i.e., a point near the right limit sensor 23, the axis passes through that point by a predetermined distance and then turns back to the right. Here, the place where the axis again encounters the central sensor 22 is determined as the absolute zero point. The absolute zero point is determined through the above steps because the main controller 11 cannot capture a position where the axis of the robot begins to move.

However, by the above method, when the main controller 11 transmits to the position controller 13 a command for returning to the zero point, in accordance with signals received from the sensors, a previous position control command (i.e., a position control command already transmitted to the position controller 13) still operates the position controller 13 and the motor 15 to thereby move the robot axis. Accordingly, the axis cannot always stop at the absolute zero point.

To solve the above-mentioned problem, a period of a position control command which the main controller 11 transmits to the position controller 13 can be shortened. However, the method requires more time for controlling a position of the robot axis, thereby lengthening the time required for returning to the zero point.

SUMMARY OF THE INVENTION

Accordingly, it is an object of the present invention to provide a method of an industrial controller for returning to an absolute zero point in which a main controller receives signals of right and left limit sensors and a center sensor and a position controller controls a motor, to thereby quickly determine an absolute zero point of an axis and stop the axis precisely at the absolute zero point.

To accomplish the above object, there is provided a method of an industrial controller for returning to an absolute zero point. The industrial controller includes right and left sensors, a center sensor, main control means, position control means and a motor, and the method, which controls at least one operational axis, comprises the steps of: (a) periodically transmitting, from the main control means to the position control means, a position control command for returning the axis to the absolute zero point on the basis of signals from the sensors; (b) performing interpolation by the position control means so as to divide a period of the position control command by a predetermined time interval; (c) controlling the motor according to the position control command of the position control means so as to move the axis in one direction and then in the reverse direction so as to meet with the center sensor after the axis meets with the right or left limit sensors; (d) detecting a shift value between the axis and the absolute zero point so as to determine whether the axis which has been moved according to step (c) is located on the absolute zero point; and (e) controlling the motor according to the interpolated time interval by the position control means when the shift value is not zero so as to exactly return the axis to the absolute zero point.

It is preferable that the step (e) further comprises the steps of: (e-1) determining whether a zero-pulse is generated from the motor indicating that the axis is located on the absolute zero point; and (e-2) repeatedly performing the step (e) until the zero-pulse is detected in the step (e-1).

BRIEF DESCRIPTION OF THE DRAWINGS

The above object and advantages of the present invention will become more apparent by describing in detail a preferred embodiment thereof with reference to the attached drawings in which:

FIG. 3 is a flow chart for illustrating a method of an industrial controller for returning to an absolute zero point according to the present invention.

DETAILED DESCRIPTION OF THE INVENTION

Figure 1:
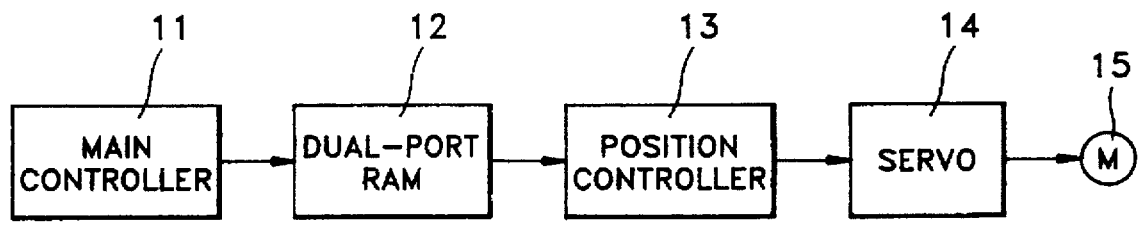
FIG. 1 is a block diagram of a typical robot controller.
Figure 2:
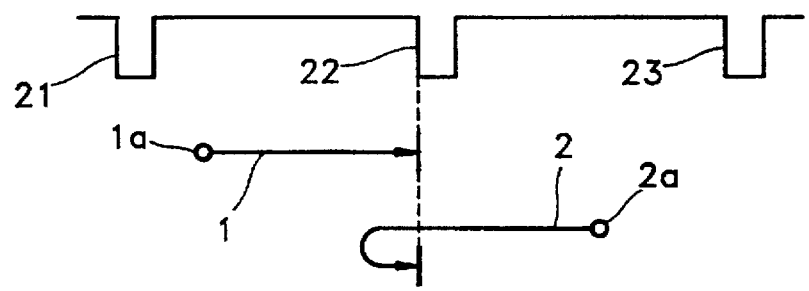
FIG. 2 is a view for illustrating a conventional method of returning of an industrial controller for returning to an absolute zero point.

A controller, shown in FIG. 1, which utilizes the method of the present invention for returning to an absolute zero point is provided with a main controller 11, a dual-port RAM 12, a position controller 13, a servo 14 and a motor 15. The main controller 11 receives signals from right and left limit sensors 21 and 23 and a central sensor 22 which correspond to each axis of a robot (see FIG. 2).

An operation for returning to the zero point is performed as follows. A period of a position control command which is transmitted from the main controller 11 to the position controller 13 via the dual-port RAM 12 is divided into a period of a smaller time interval by interpolation, and the servo 14 controls the motor 15 during each of the divided time intervals.

An operation sequence for returning to the absolute zero point will be described as follows with reference to FIG. 3.

First, when the main controller 11 receives a command (e.g., from a user) for returning to the absolute zero point, the main controller 11 outputs a position control command to the position controller 13 to return an axis of the robot to the absolute zero point on the basis of the signals of the sensors (step 31). Then, the position controller 13 performs an interpolation which divides the period of the position control command received from the main controller 11 to obtain a predetermined time interval by which the position control is performed (step 32). For example, if a position control period of a motor 15 corresponding to the position control command transmitted from the main controller 11 in step 31 is 8.16 ms, in step 32 the position controller 13 might divide a period of the position control period to obtain a time interval of 1 ms for performing the return to the zero point.

When the motor 15 is controlled according to the position control period interpolated by the position controller 13 and then the robot axis moves toward the right or left limit sensor 21 or 23, the axis moves again in the reverse direction to meet with the center sensor 22 (step 33). When the axis encounters the center sensor 22, the main controller 11 stops the position command transmitted to the position controller 13 to thereby stop the movement of the axis.

Then, it is ascertained whether the shift value (i.e., the distance which the axis deviates from the center sensor 22) is zero (step 34). If the shift value is zero, the main controller 11 is informed that the return to the absolute zero point is completed (step 39) and the process is terminated. If the shift value is not zero in step 34, that is, if the axis stops away from the center sensor 22, a current position is ascertained and a target position is calculated (step 35).

Then, the motor 15 is gradually controlled by a position control command to move the axis in the opposite direction so that the axis meets with the center sensor 22 (step 36). Here, the position control command, i.e., a control value of the motor, determines the rotating speed and the rotating direction of the motor 15. For instance, when a positive value is given, the motor 15 rotates clockwise, and when a negative value is given, the motor rotates counter-clockwise.

When the center sensor 22 senses the axis, the main controller 11 outputs a command to the position controller 13, for detecting a zero-pulse of the motor 15, to thereby ascertain whether the axis is located at the absolute zero point (step 37).

In step 37, if the zero-pulse is detected, the shift value with respect to the center sensor 22 is zero (step 38). Thus, the main controller 11 is informed that the return to the absolute zero point is completed (step 39) and the process terminates.

If the zero-pulse is not detected in step 37, steps 35 and 36 of the process are re-executed. In this feedback loop, when the position controller 13 receives the command for detecting a zero-pulse of the motor 15 from the main controller 11, a difference value between a target position and a moved position in each position control period is determined as a new shift value. When the zero-pulse is generated from the motor 15, the shift value becomes zero, and thus the return to the absolute zero point is completed.

Accordingly, the main controller 11 determines an approximate position of the absolute zero point by the sensors, and then the position controller 13 detects the zero-pulse generated from the motor 15 on the basis of the interpolated position control command. Thus, the absolute zero point is always positioned at a predetermined location. Furthermore, the zero-pulse is detected and the shift value is calculated without involvement of the main controller 11.

As described above, according to the method of the present invention, the main controller moves the axis toward the center sensor on the basis of a position signal of the axis received from the right and left limit sensors and the center sensor, to determine the approximate position of the absolute zero point. Then, the position controller directs movement of the industrial controller according to a relatively short time interval interpolated by the position controller until the position controller detects a zero-pulse generated from the motor, thereby determining the absolute zero point. As a result, the absolute zero point is always positioned at a predetermined location, and since the speed of detecting the zero-pulse can be determined by the position controller regardless of the main controller, the time required for returning to the absolute zero point is reduced.

What is claimed is:

1. A method of returning to an absolute zero point of an industrial controller which includes right and left limit sensors, a center sensor, main control means, position control means and a motor, and which controls at least one operational axis, the method comprising the steps of:

(a) periodically transmitting, from the main control means to the position control means, a position control command for returning the axis to an absolute zero point on the basis of signals from the sensors;

(b) performing interpolation in the position control means so as to divide a period of the position control command by a predetermined quantity to obtain an interpolated time interval;

(c) controlling the motor according to said position control command of said position control means so as to move said axis, and moving said axis in the reverse direction so as to meet with said center sensor when said axis meets with either the right limit sensor or the left limit sensor;

(d) detecting a shift value between the axis and the absolute zero point so as to determine whether the axis which has been moved according to said step (c) is located on the absolute zero point; and (e) controlling the motor according to the interpolated time interval by said position control means when the shift value is not zero so as to exactly return the axis to the absolute zero point.

2. A method of returning to an absolute zero point of an industrial controller according to claim 1, wherein said step (e) further comprises the steps of:

(e-1) determining whether a zero-pulse generated from the motor is detected so as to ascertain whether the axis is located on the absolute zero point; and (e-2) repeatedly performing said step (e) until the zero-pulse is detected.

3. A method of returning to an absolute zero point of an industrial controller according to claim 1, wherein a motor rotation speed of said step (e) is determined by the shift value.

* * * * *